United States Patent
Segawa et al.

(10) Patent No.: US 7,441,562 B2
(45) Date of Patent: Oct. 28, 2008

(54) ELECTROMAGNETIC VALVE AND FLUID CONTROL APPARATUS

(75) Inventors: Taro Segawa, Kariya (JP); Hiroyuki Shinkai, Kariya (JP); Masahiko Kamiya, Kariya (JP); Hidenobu Kajita, Kariya (JP); Shinichi Tsujimura, Kariya (JP)

(73) Assignee: Advics Co., Ltd., Aichi-pref (JP)

( * ) Notice: Subject to any disclaimer, the term of this patent is extended or adjusted under 35 U.S.C. 154(b) by 478 days.

(21) Appl. No.: 11/137,436

(22) Filed: May 26, 2005

(65) Prior Publication Data

US 2005/0274921 A1 Dec. 15, 2005

(30) Foreign Application Priority Data

Jun. 11, 2004 (JP) ............... 2004-173954
Jun. 11, 2004 (JP) ............... 2004-173955

(51) Int. Cl.
*F16K 31/02* (2006.01)

(52) U.S. Cl. ................... 137/557; 251/129.15

(58) Field of Classification Search ............ 251/129.15; 137/557; 303/119.2, 119.3, 119.1
See application file for complete search history.

(56) References Cited

U.S. PATENT DOCUMENTS

| | | | | |
|---|---|---|---|---|
| 5,752,489 A | * | 5/1998 | Henderson et al. | ...... 251/129.07 |
| 6,374,679 B1 | * | 4/2002 | Babala et al. | .................. 73/715 |
| 6,745,634 B2 | * | 6/2004 | Beck et al. | ............... 303/119.3 |
| 6,772,778 B2 | * | 8/2004 | Morosini et al. | ............ 362/102 |
| 2002/0047304 A1 | * | 4/2002 | Bolitho et al. | ........... 303/119.2 |

* cited by examiner

*Primary Examiner*—John Bastianelli
(74) *Attorney, Agent, or Firm*—Posz Law Group, PLC

(57) ABSTRACT

A stopper formed of a magnetic material and forming a portion of a magnetic circuit has a deformable portion that deforms in accordance with the pressure in a space within a sleeve. The deformable portion is provided with a pressure sensor that measures the amount of deformation of the deformable portion. The deformable portion, corresponding to a diaphragm, is formed in the stopper, which is a conventional electromagnetic valve component part. Therefore, it is no longer necessary to provide a diaphragm or a seal member.

16 Claims, 8 Drawing Sheets ly mounted onto a stopper (see, for example, Japanese
ELECTROMAGNETIC VALVE AND FLUID CONTROL APPARATUS

CROSS REFERENCE TO RELATED APPLICATION

This application is based upon and claims the benefit of Japanese Patent Application No. 2004-173954 filed on Jun. 11, 2004 and No. 2004-173955 filed on Jun. 11, 2004, the content of which are incorporated herein by reference.

FIELD OF THE INVENTION

The present invention relates to an electromagnetic valve integrated with a pressure sensor, and to a fluid control apparatus that opens and closes a fluid conduit using of the electromagnetic valve.

RELATED ART OF THE INVENTION

In a related electromagnetic valve integrated with a pressure sensor, the pressure sensor that measures the amount of deformation of a diaphragm that deforms in accordance with the pressure in the electromagnetic valve is attached to the diaphragm, and the diaphragm and the pressure sensor are airtightly mounted onto a stopper (see, for example, Japanese Patent Kohyo Publication (Japanese Translation of PCT International Application) No. 2003-522677).

However, in the electromagnetic valve shown in the aforementioned Japanese Patent Kohyo Publication, the diaphragm and the stopper are separate members, and therefore a seal member or the like for maintaining airtightness between the diaphragm and the stopper is needed. Thus, the electromagnetic valve has a problem of an increased number of component parts and therefore increased cost.

SUMMARY OF THE INVENTION

It is an object of the present invention to reduce the number of component parts of an electromagnetic valve integrated with a pressure sensor, and therefore reduce costs.

In an electromagnetic valve according to a first aspect of the present invention, a stopper is formed of a magnetic material and forms a portion of a magnetic circuit, a deformable portion that deforms in accordance with a pressure in a space in a sleeve is formed in the stopper, and the deformable portion is provided with a pressure sensor that measures an amount of deformation of the deformable portion.

Therefore, since the deformable portion, corresponding to the diaphragm in the related electromagnetic valve, is formed in the stopper, it is no longer necessary to provide a diaphragm or a seal member. Hence, the number of component parts of the electromagnetic valve can be reduced, and therefore cost can be reduced.

In this construction, a strain gage may be directly joined to the deformable portion. Therefore, a simple structure can be achieved.

For example, the deformable portion may be formed in an end surface of another end side of the stopper. Therefore, the handling of the sensor portion becomes easy.

Furthermore, the deformable portion may have a generally flat surface. If the deformable portion has a generally flat surface, the pressure sensor can easily be mounted.

In the first aspect of the present invention, wall thickness of the deformable portion may be thinner than another portion of the stopper. Therefore, deformation of the deformable portion becomes easy, and the sensor sensitivity improves.

In the first aspect of the present invention, the stopper may be made of a material that has substantially the same linear expansion coefficient as the pressure sensor. Therefore, the amount of temperature correction with respect to the signal from the pressure sensor reduces, and the temperature correction becomes easy. Furthermore, the reliability of the junction portions of the-sensor increases.

For example, the pressure sensor may be a semiconductor-made sensor, and the stopper may be made of a material that has substantially the same linear expansion coefficient as a semiconductor.

Therefore, the temperature correction with respect to the signal from the pressure sensor becomes easy. Furthermore, conforming the linear expansion coefficient of the stopper to the linear expansion coefficient of the pressure sensor reduces the stress associated with changes in temperature, and therefore makes the semiconductor-made pressure sensor less prone to failure even though an allowable elongation for the semiconductor-made pressure sensor is small.

Furthermore, since semiconductor chips can easily be mass-produced, and provide good sensor sensitivity, low cost and high performance can be expected.

In the first aspect of the present invention, the pressure sensor and a signal processing circuit may be integrated in a chip. Therefore, the pressure sensor and the signal processing circuit can be reduced in size.

Furthermore, in the first aspect of the present invention, a signal processing circuit that processes a signal from the pressure sensor may be attached to the stopper.

Incidentally, a unique correction value is input to the signal processing circuit in accordance with the pressure sensor combined therewith. Therefore, if only one of the signal processing circuit and the pressure sensor fails, both of them must be discarded. Furthermore, if the signal processing circuit is attached to a circuit board for controlling the electromagnetic valve, the circuit board must also be discarded.

However, in the case where the pressure sensor and the signal processing circuit are integrated in a single chip, or where the signal processing circuit is attached to the stopper, in other words, in the case where the signal processing circuit is not attached to the circuit board for controlling the electromagnetic valve, the circuit board does not need to be discarded if the signal processing circuit or the pressure sensor fails.

Furthermore, since both the pressure sensor and the signal processing circuit are attached to the stopper, the operation of inputting a correction value to the signal processing circuit can easily be carried out.

In an electromagnetic valve in accordance with a second aspect of the present invention, an outer peripheral surface of a stopper has a load receiving portion that receives a load in a direction of an axis of the stopper.

Therefore, it is not necessary to provide a load receiving portion in an outer peripheral region or the like of the pressure sensor-attached site in the end surface of the stopper. Hence, a diameter reduction of the stopper and therefore a size reduction of the electromagnetic valve can be achieved.

In this construction, the load receiving portion may be a friction surface that has a greater surface roughness than another surface of the stopper.

Furthermore, the load receiving portion may be a recess portion receding from the outer peripheral surface of the stopper. In this construction, a surface of the recess portion which receives the load in the direction of the axis of the stopper may be substantially perpendicular to the direction of the axis of the stopper.

In the second aspect of the present invention, the load receiving portion may be a protrusion portion protruding from the outer peripheral surface of the stopper which is apart from the sensor attached surface. This construction can prevent the press-in load from affecting the sensor.

In this construction, a surface of the protrusion portion which receives the load in the direction of the axis of the stopper may be substantially perpendicular to the direction of the axis of the stopper.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
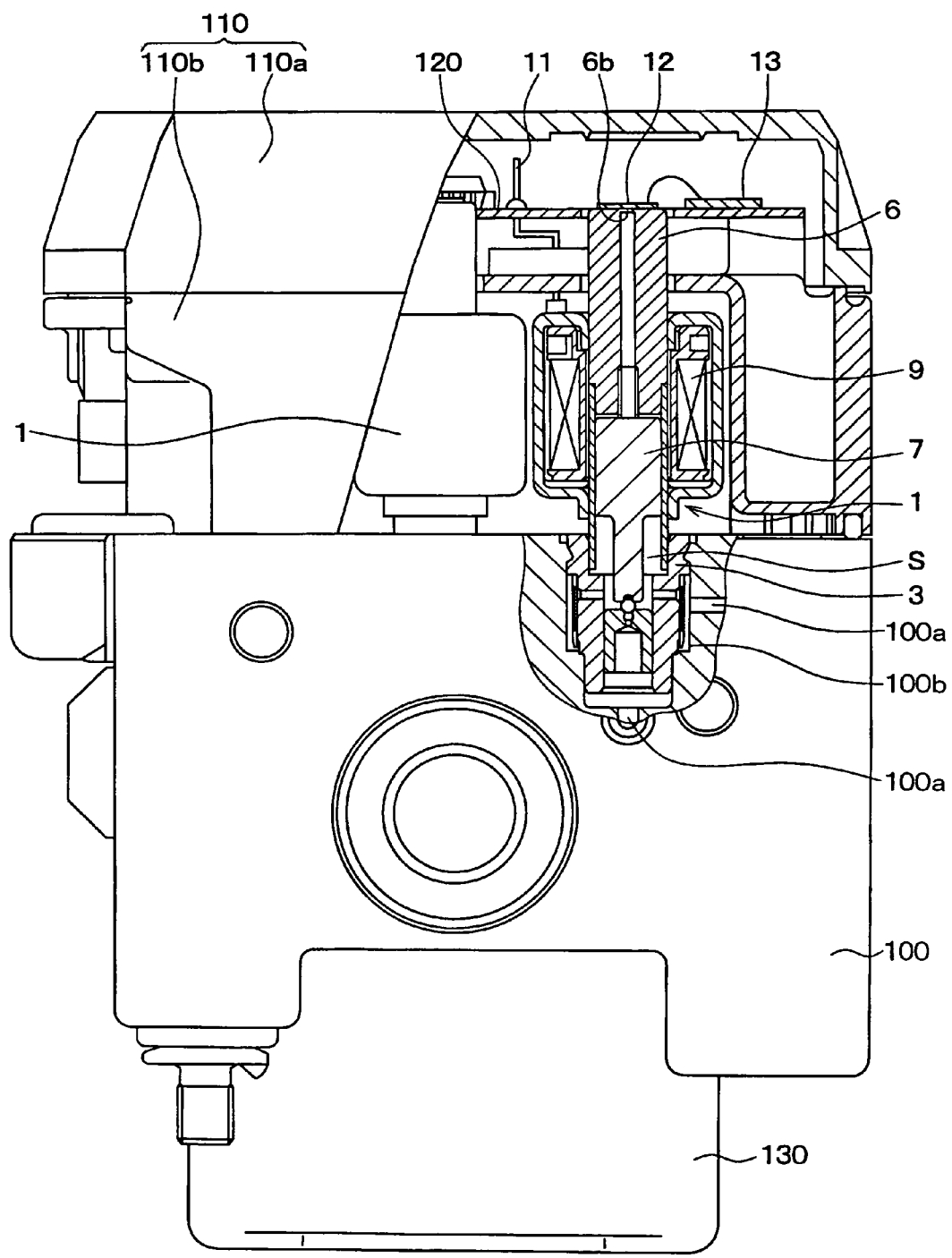
FIG. 1 is a partially sectional view of a hydraulic control actuator in which an electromagnetic valve in accordance with a first embodiment of the present invention is installed.

The present invention will be described further with reference to various embodiments in the drawings.

First Embodiment

Figure 2:
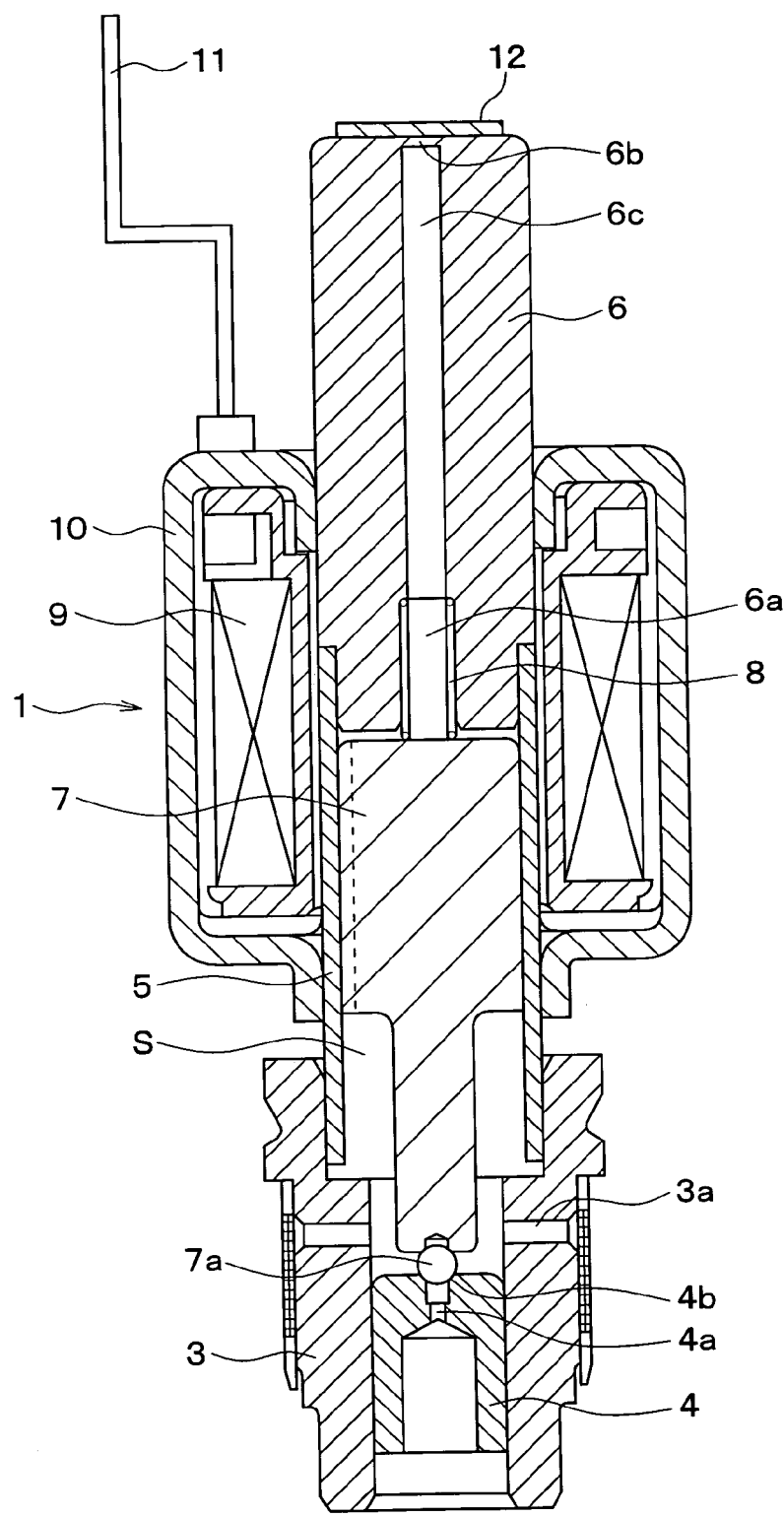
FIG. 2 is a sectional view of the electromagnetic valve shown in FIG. 1.

An electromagnetic valve in accordance with a first embodiment of the present invention will be described. FIG. 1 is a partially sectional view of a hydraulic control actuator in which an electromagnetic valve in accordance with the first embodiment is installed. FIG. 2 is a sectional view of the electromagnetic valve shown in FIG. 1.

The hydraulic control actuator is used to avoid a wheel lock tendency by increasing or decreasing the brake fluid pressure in a vehicle, or for vehicle body motion control or regenerative brake control.

As shown in FIG. 1, the hydraulic control actuator has an aluminum-made housing 100. In the housing 100, a reservoir (not shown) that receives brake fluid from a wheel cylinder (not shown) at the time of decreasing the brake fluid pressure, a pump (not shown) that sucks the brake fluid released into the reservoir and discharges the brake fluid into a conduit connecting a master cylinder (not shown) and the wheel cylinder are installed.

A plurality of electromagnetic valves 1 are disposed in a predetermined arrangement on a side surface (upper end surface) of the housing 100. Specifically, a portion of a guide 3 (described in detail later) of each electromagnetic valve 1 is fitted into a recess portion 100b of the housing 100. Then, by caulking a vicinity of an opening end of the recess portion 100b, a portion of the housing 100 is forced to enter a dent of the guide 3, so that the guide 3 is secured to the housing 100.

A resin-made cover 110 is screwed to the housing 100. The electromagnetic valves 1 are clamped between the housing 100 and the cover 110.

The cover 110 is separated into an upper cover 110a and a lower cover 110b. A circuit board 120 having a control circuit is housed in the upper cover 110a. The electromagnetic valves 1 are housed in the lower cover 110b. The control circuit of the circuit board 120 is provided for controlling the current flow to an electric motor 130 that drives a pump and for controlling the current flow to the electromagnetic valves 1.

Each electromagnetic valve 1 in this embodiment is a normally closed-type electromagnetic valve, and is provided on the conduit 100a connecting the wheel cylinder and the reservoir, and, at the time of decreasing the brake fluid pressure, the electromagnetic valve 1 is opened to open the conduit 100a and thus release brake fluid from the wheel cylinder to the reservoir. Incidentally, the conduit 100a corresponds to a fluid conduit in the present invention.

As shown in FIG. 2, each electromagnetic valve 1 is provided with a guide 3 formed of a metal into a tubular shape. A valve seat 4 formed of a metal into a tubular shape is pressed into an end side of the guide 3, and a thin-walled tubular sleeve 5 made of a non-magnetic metal is pressed into the other end side of the guide 3. A bottomed tubular stopper 6 formed of a magnetic metal is pressed into the sleeve 5. Thus, the stopper 6 closes an end of a space S defined within the sleeve 5.

The space S communicates with the conduit 100a shown in FIG. 1 via a communicating hole 3a formed in a side face of the guide 3, and a communicating hole 4a formed in a diametrally central portion of the valve seat 4. In the space S, an armature 7 formed of a magnetic metal into a cylindrical shape is disposed. The armature 7 is held slidably by the sleeve 5.

A spherical valve body 7a is secured to end portion of the armature 7 on a side of a valve seat 4. An end portion of the space S on a side of the communicating hole 4a of the valve seat 4 has a taper valve seat face 4b on which the valve body 7a of the armature 7 touches and separates.

A spring 8 is disposed in a spring hole 6a formed in the stopper 6. The spring 8 urges the armature 7 toward the side of the valve seat 4. The spring hole may be formed in the armature 7 as well.

A coil 9 that forms a magnetic field when energized is disposed at an outer peripheral side of the sleeve 5 and the stopper 6. The coil 9 is accommodated in a yoke 10 made of a magnetic metal. A terminal 11 extends out from the coil 9. Via the terminal 11, the coil 9 can be energized from outside.

An end portion of the stopper 6 has a deformable portion 6b that deforms in accordance with the brake fluid pressure. A pressure delivery hole 6c for delivering the brake fluid pressure from the space S to the deformable portion 6b is formed within the stopper 6.

A pressure sensor 12 that detects the brake fluid pressure in the space S by measuring the amount of deformation of the deformable portion 6b is directly joined to an outer surface (upper end surface) of the deformable portion 6b. In order to facilitate the mounting of the pressure sensor 12, the outer surface of the deformable portion 6b is made flat. Furthermore, a thickness of the deformable portion 6b is made thinner than other portions of the stopper 6, in order to facilitate the deformation thereof.

As for the material of the stopper 6, it is preferable to use a material that has the same linear expansion coefficient as the pressure sensor 12 or an adhesive or the like that is used for securing the pressure sensor 12. However, they may have some difference in the linear expansion coefficient, as long as the deformation of the stopper 6 is appropriately followed by deformation of the pressure sensor 12 in an expected temperature range of use (normally, about −40° C. to 120° C.).

Incidentally, the pressure sensor 12 used in this embodiment is a semiconductor-made strain gage based pressure sensor whose specific resistance is variable in accordance with stress. Therefore, the stopper 6 is made of a material whose linear expansion coefficient is substantially equal to that of the semiconductor. For example, if a silicon is used as a material of the pressure sensor 12, the linear expansion coefficient thereof is preferably 11 ppm/° C. or less.

As shown in FIG. 1, the circuit board 120 is provided with a signal processing circuit 13 that processes the signal from the pressure sensor 12. More specifically, the signal processing circuit 13 performs a temperature correction, a linearity correction, etc. on the signal from the pressure sensor 12, and is connected to the control circuit of the circuit board 120.

The stopper 6 of each electromagnetic valve 1 extends, toward the side of the circuit board 120, to such a position that the deformable portion 6b is substantially flush with the surface of the circuit board 120, and more specifically, to such a position that the deformable portion 6b slightly protrudes from the surface of the circuit board 120. Therefore, when an electromagnetic valve 1 is mounted onto the housing 100 and the cover 110, the pressure sensor 12 and the signal processing circuit 13 lie substantially on the same plane.

The pressure sensor 12 and the signal processing circuit 13 are connected by wire bonding. The terminal 11 extending out from the coil 9 is soldered to the circuit board 120.

In each of the electromagnetic valves 1 constructed as described above, when the coil 9 is not energized, the armature 7 is urged by elastic force of the spring 8 toward the side of the valve seat 4 so that the valve body 7a sits on the valve seat face 4b of the valve seat 4, thereby closing the conduit 100a, as indicated in FIG. 1.

On the other hand, when the coil 9 is energized, the coil 9 forms a magnetic field, so that a magnetic path is formed by the stopper 6, the armature 7, etc. Therefore, due to magnetic attraction force, the armature 7 is attracted toward the side of the stopper 6, so that the armature 7 moves against the force of the spring 8. Hence, the armature 7 assumes a state where the valve body 7a is apart from the valve seat face 4b of the valve seat 4, so that the conduit 100a is in a communication state via the communicating holes 3a, 4a and the space S.

Through operation of the electromagnetic valve 1, the brake fluid pressure in the space S is controlled, and the deformable portion 6b deforms in accordance with the brake fluid pressure in the space S, and the resistance value of the pressure sensor 12 changes in accordance with the amount of deformation of the deformable portion 6b. Then, on the basis of the resistance value of the pressure sensor 12, the signal processing circuit 13 outputs an electric signal corresponding to the brake fluid pressure in the space S.

In this embodiment, the deformable portion 6b corresponding to the diaphragm in a related electromagnetic valve is formed in the stopper 6, and therefore it is no longer necessary to provide such a diaphragm or a seal member. Furthermore, since a member of the electromagnetic valve is utilized to dispose the sensor portion near the circuit board for electrical connection thereto, the number of component parts of the electromagnetic valve can be reduced, and therefore cost can be reduced.

Second Embodiment

Figure 3:
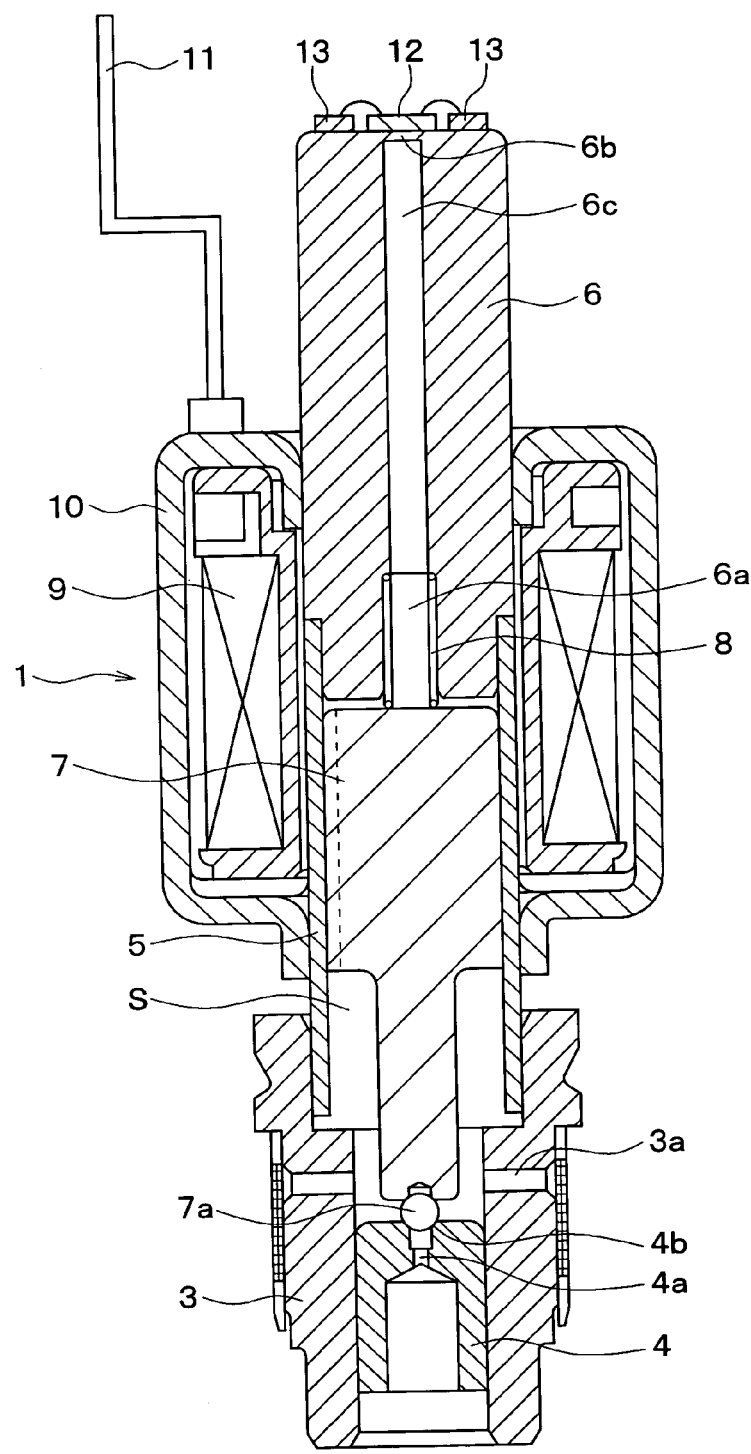
FIG. 3 is a sectional view of an electromagnetic valve in accordance with a second embodiment of the present invention.

A second embodiment of the present invention will be described. FIG. 3 is a sectional view of an electromagnetic valve 1 in accordance with the second embodiment. The portions that are the same as or equivalent to those of the first embodiment are represented by the same reference numerals and characters, and will not be described again.

In the first embodiment, the pressure sensor 12 is provided on the deformable portion 6b of the stopper 6, and the signal processing circuit 13 is provided on the circuit board 120. In the second embodiment, in contrast, a pressure sensor 12 and a signal processing circuit 13 are provided on a deformable portion 6b of a stopper 6.

Incidentally, a unique correction value is input to the signal processing circuit 13 in accordance with the pressure sensor 12 combined therewith. Therefore, if only one of the signal processing circuit 13 and the pressure sensor 12 fails, both of them must be discarded. Furthermore, if the signal processing circuit 13 is attached to the circuit board 120, the circuit board 120 must also be discarded.

In contrast, in the second embodiment, since the pressure sensor 12 and the signal processing circuit 13 are both attached to the stopper 6, that is, since the signal processing circuit 13 is not attached to the circuit board 120, the circuit board 120 does not need to be discarded if the signal processing circuit 13 or the pressure sensor 12 fails.

Furthermore, since the pressure sensor 12 and the signal processing circuit 13 are both attached to the stopper 6, the operation of inputting a correction value to the signal processing circuit 13 can easily be carried out.

Furthermore, if the pressure sensor 12 and the signal processing circuit 13 are integrated through the use of a semiconductor, the pressure sensor 12 and the signal processing circuit 13 can be reduced in size.

Third Embodiment

A third embodiment of the present invention will be described. This embodiment allows a diameter reduction of a stopper 6 and therefore a size reduction of the electromagnetic valve in a construction as described above where a pressure sensor 12 is disposed on a deformable portion 6b of the stopper 6.

In the electromagnetic valve shown in the aforementioned Japanese Patent Kohyo Publication, in order to adjust the stroke of the armature, the stopper is pressed into the sleeve to carry out the positioning.

However, in order to cause press-in load (=load in the direction of the axis of the stopper) to act on the stopper when the stopper is to be pressed into the sleeve, a space for receiving the press-in load needs to be separately provided in the end surface of the stopper where the pressure sensor is attached. Hence, there is a problem of an increased outside diameter of the stopper and therefore an increased size of the electromagnetic valve.

Furthermore, pushing the sensor-attached end surface involves the possibility that load acts on the sensor adjacent the sensor-attached end surface, thus raising anxieties about adverse effects, such as detachment of the sensor attached surface, change of the correction value, etc.

Therefore, according to this embodiment, in the electromagnetic valve in which the pressure sensor is attached to the end surface of the stopper, it is aimed to reduce the diameter of the stopper and therefore reduce the size of the electromagnetic valve, and to allow removal of adverse effects of the press-in operation on the sensor.

Figure 4:
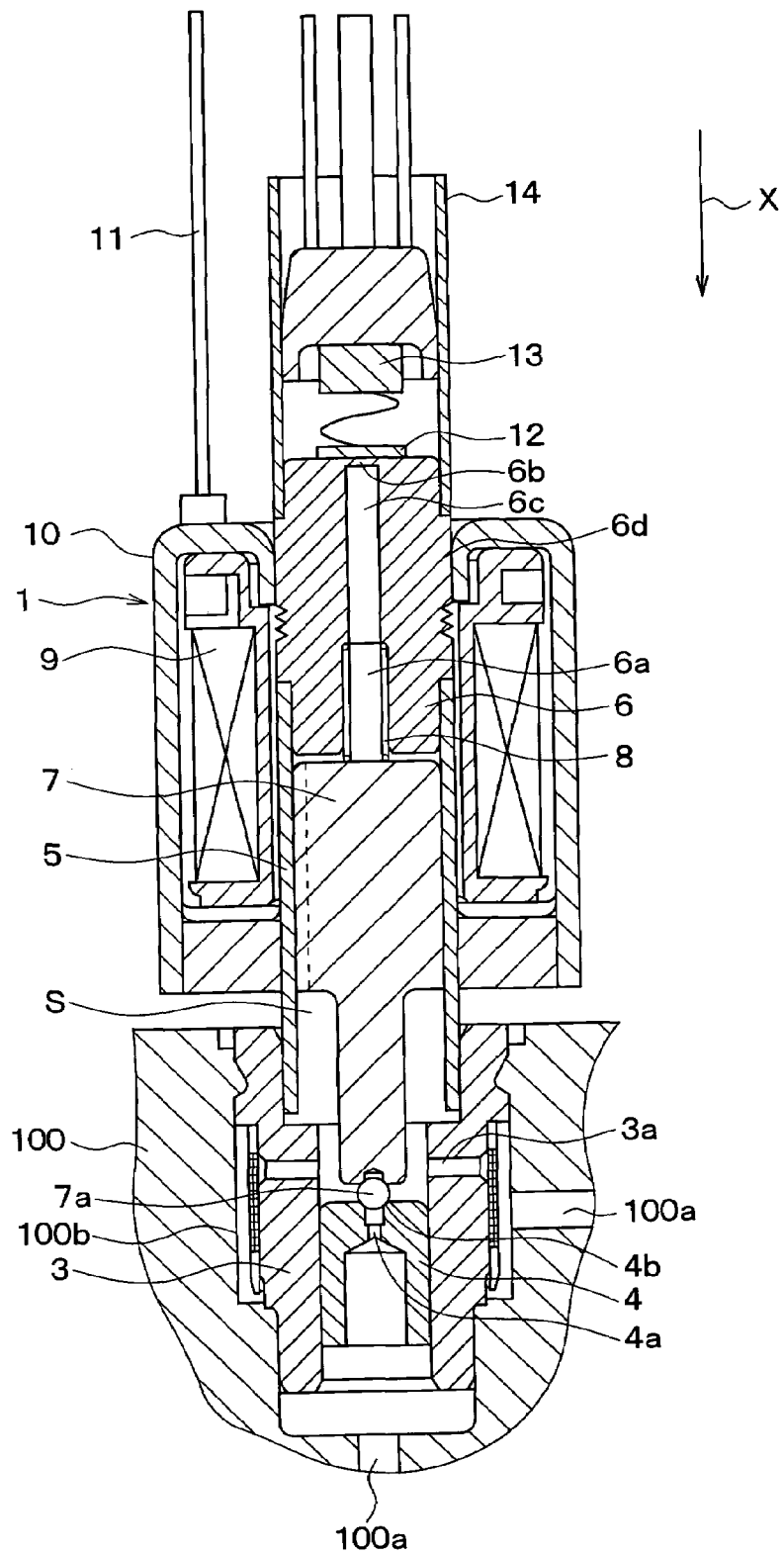
FIG. 4 is a sectional view showing an overall construction of an electromagnetic valve in accordance with a third embodiment of the present invention.
Figure 5:
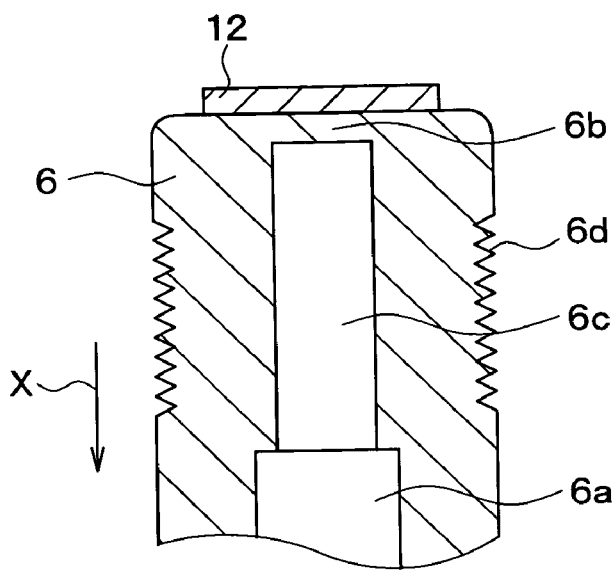
FIG. 5 is a sectional view of a stopper shown in FIG. 4.

FIG. 4 is a sectional view showing an overall construction of an electromagnetic valve 1 in the third embodiment. FIG. 5 is a sectional view of the stopper 6 shown in FIG. 4. The portions that are the same as or equivalent to those of the first embodiment are represented by the same reference numerals and characters, and will not be described again.

As shown in FIG. 4, an outer peripheral surface of the stopper 6 has a friction surface 6d that has been formed by, for example, a knurling process, so as to have a greater surface roughness than other surfaces of the stopper 6. To press the stopper 6 into the sleeve 5, the sleeve 5 and the stopper 6 are coaxially placed, and then the stopper 6 is moved in the direction X of the axis of the stopper by holding the friction surface 6d of the stopper with a jig (not shown). Incidentally, the friction surface 6d corresponds to a load receiving portion in the present invention.

A cover 14 formed of a metal, a resin or the like into a thin-walled tubular shape is attached to the stopper 6. A signal processing circuit 13 that processes the signal from the pressure sensor 12 is disposed within the cover 14.

Next, a process of pressing the stopper 6 into the sleeve 5 will be described. First, the guide 3, the valve seat 4, and the sleeve 5 are put together to form a first subassembly, and the stopper 6, the pressure sensor 12, the cover 14, and the signal processing circuit 13 are put together to form a second subassembly.

Subsequently, the armature 7 is inserted into the first subassembly, and the spring 8 is inserted into the second subassembly. Then, the sleeve 5 (i.e., the first assembly) and the stopper 6 (i.e., the second assembly) are coaxially placed, and the stopper 6 is pressed into the sleeve 5 by holding the friction surface 6d of the stopper 6 with a jig. At this occasion, the press-in extent of the stopper 6 is adjusted so that the stroke of the armature 7 becomes equal to a predetermined stroke.

In this embodiment, since the friction surface 6d provided on the outer peripheral surface of the stopper 6 is used to apply a press-in load (=load in the direction of the axis of the stopper) to the stopper 6, it is not necessary to provide a load receiving portion in an outer peripheral region of a portion, at which the pressure sensor 12 is attached, in the end surface of the stopper 6. Therefore, a diameter reduction of the stopper 6 and therefore a size reduction of the electromagnetic valve 1 can be achieved.

Furthermore, since the friction surface 6d has a great surface roughness, it can reliably transfer large load.

Fourth Embodiment

Figure 6:
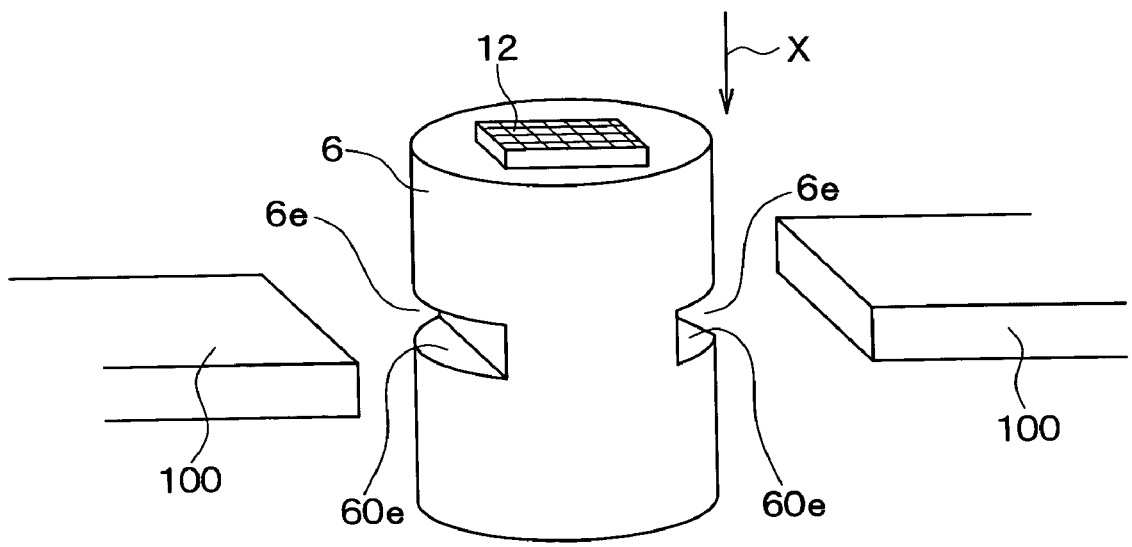
FIG. 6 is a perspective view of a stopper of an electromagnetic valve in accordance with a fourth embodiment of the present invention.

A fourth embodiment of the present invention will be described. FIG. 6 is a perspective view of a stopper of an electromagnetic valve in accordance with the fourth embodiment. In this embodiment, a recess portion 6e is provided instead of the friction surface 6d of the first embodiment.

As shown in FIG. 6, an outer peripheral surface of a stopper 6 has two axially symmetrical recess portions 6e receding from the outer peripheral surface. Viewed from a side of the stopper 6, the recess portions 6e have a rectangular cutout shape. A surface 60e of each recess portion 6e which receives load in the direction X of the axis of the stopper is perpendicular to the direction X of the axis of the stopper. Incidentally, the recess portions 6e correspond to a load receiving portion in the present invention.

When the stopper 6 is to be pressed into the sleeve 5, platy jigs 100 are inserted into the recess portions 6e. Then, the jigs 100 are moved in the direction X of the axis of the stopper so as to press the stopper 6 into the sleeve 5.

In this embodiment, since the recess portions 6e of the outer peripheral surface of the stopper 6 are used to apply the press-in load to the stopper 6, it is not necessary to provide a load receiving portion in an outer peripheral region of a portion, at which the pressure sensor 12 is attached, in the end surface of the stopper 6. Therefore, a diameter reduction of the stopper 6 and therefore a size reduction of the electromagnetic valve 1 can be achieved.

Furthermore, the surfaces 60e that receive the load in the direction X of the axis of the stopper are perpendicular to the direction X of the axis of the stopper, the surfaces 60e can reliably receive the press-in load (=load in the direction of the axis of the stopper) when the stopper 6 is pressed into the sleeve 5.

Fifth to Seventh Embodiments

Figure 7:
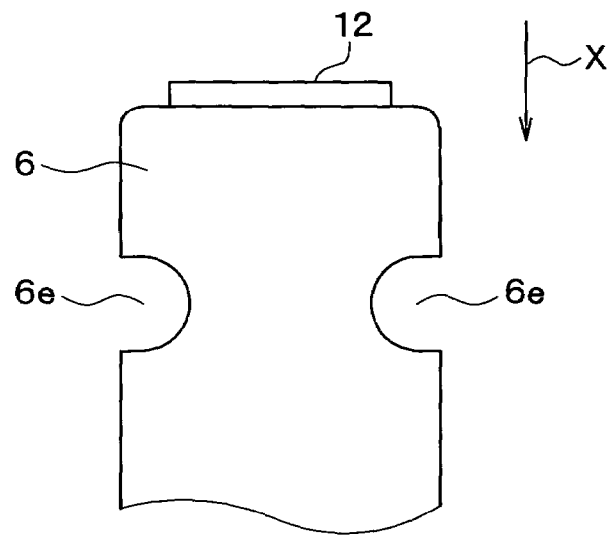
FIG. 7 is a side view of a stopper of an electromagnetic valve in accordance with a fifth embodiment of the present invention.
Figure 8:
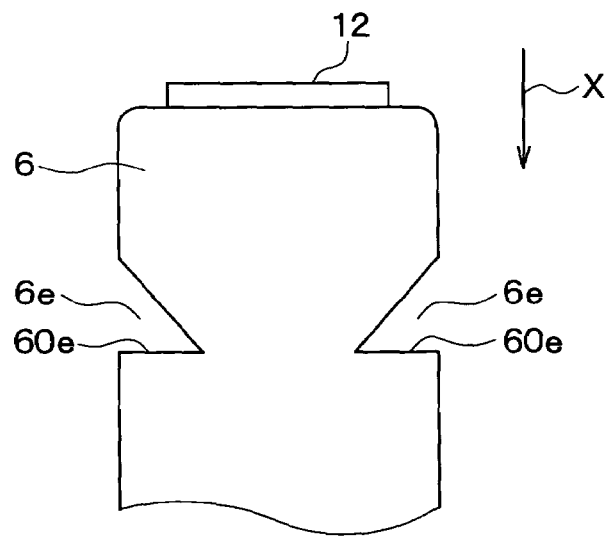
FIG. 8 is a side view of a stopper of an electromagnetic valve in accordance with a sixth embodiment of the present invention.
Figure 9:
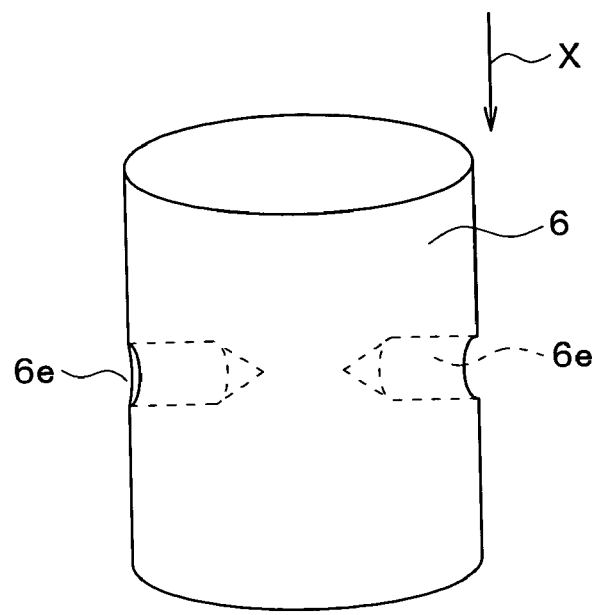
FIG. 9 is a perspective view of a stopper of an electromagnetic valve in accordance with a seventh embodiment of the present invention.

Fifth to seventh embodiments of the present invention will be described. FIG. 7 is a side view of a stopper 6 of an electromagnetic valve in accordance with the fifth embodiment. FIG. 8 is a side view of a stopper of an electromagnetic valve in accordance with the sixth embodiment. FIG. 9 is a perspective view of a stopper of an electromagnetic valve in accordance with the seventh embodiment.

Although in the fourth embodiment, the recess portions 6e have a rectangular cutout shape viewed from a side of the stopper 6, the shape of the recess portions 6e may also be those adopted in the fifth to seventh embodiments.

That is, in the fifth embodiment shown in FIG. 7, the recess portions 6e have a substantially semicircular cutout shape viewed from a side of the stopper 6.

In the sixth embodiment shown in FIG. 8, the recess portions 6e have a triangular cutout shape viewed from a side of the stopper 6. The surface 60e of each recess portion 6e which receives the load in the direction X of the axis of the stopper is perpendicular to the direction X of the axis of the stopper.

In the seventh embodiment shown in FIG. 9, each recess portion 6e is a hole that extends in the direction of a diameter of the stopper. As such holes, two holes may be formed axially symmetrically as shown in FIG. 9. Furthermore, three such holes may be formed at intervals of 120°, or four such holes may be formed at intervals of 90°.

Eighth to Tenth Embodiments

Figure 10:
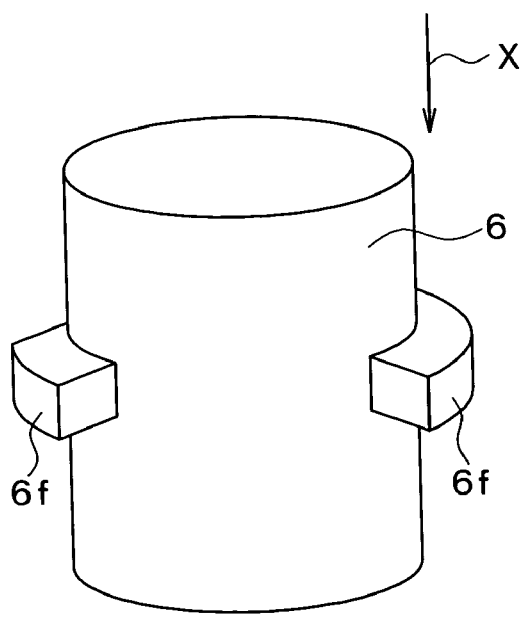
FIG. 10 is a perspective view of a stopper of an electromagnetic valve in accordance with an eighth embodiment of the present invention.
Figure 11:
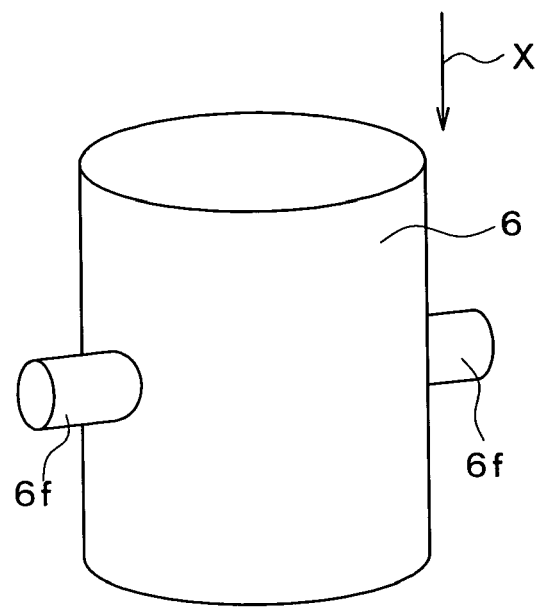
FIG. 11 is a perspective view of a stopper of an electromagnetic valve in accordance with a ninth embodiment of the present invention.
Figure 12:
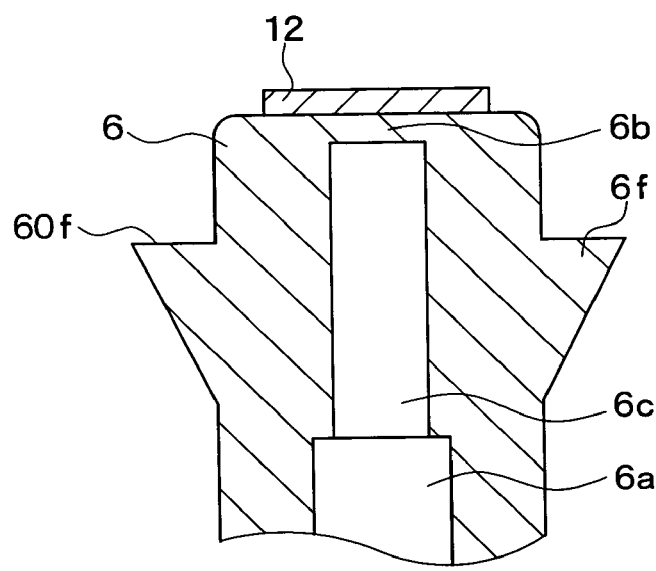
FIG. 12 is a sectional view of a stopper of an electromagnetic valve in accordance with a tenth embodiment of the present invention.

Eighth to tenth embodiments of the present invention will be described. FIG. 10 is a perspective view of a stopper 6 of an electromagnetic valve in accordance with the eighth embodiment. FIG. 11 is a perspective view of a stopper 6 of an electromagnetic valve in accordance with the ninth embodiment. FIG. 12 is a sectional view of a stopper 6 of an electromagnetic valve in accordance with the tenth embodiment.

In each of the eighth to tenth embodiments, protrusion portions 6f protruding from the outer peripheral surface of the stopper are provided instead of the friction surface 6d of the third embodiment or the recess portions 6e of the second to seventh embodiments. The protrusion portions 6f correspond to a load receiving portion in the present invention.

The protrusion portions 6f in the eighth embodiment shown in FIG. 10 have a quadrangular prism shape. The protrusion portions 6f in the ninth embodiment shown in FIG. 11 have a cylindrical shape. As such protrusion portions 6f, two protrusion portions may be formed axially symmetrically. Furthermore, three such protrusion portions may be formed at intervals of 120°, and four such protrusion portions may also be formed at intervals of 90°.

The protrusion portions 6f in the tenth embodiment shown FIG. 12 have a triangular shape viewed from a side of the stopper 6. The surface 60f of each protrusion portion 6f which receives the load in direction X of the axis of the stopper is perpendicular to the direction X of the axis of the stopper. The protrusion portions 6f may be continuously formed over the entire circumference of the stopper 6, or may also be formed intermittently in a circumferential direction.

When the stopper 6 is to be pressed into the sleeve 5, jigs (not shown) are engaged with the protrusion portions 6f. Then, the jigs are moved in the direction X of the axis of the stopper so as to press the stopper 6 into the sleeve 5.

Other Embodiments

Although in the foregoing embodiments, the pressure sensor 12 is a semiconductor-made strain gage based pressure sensor, the pressure sensor 12 may also be an electrical capacitance based pressure sensor, an optical fiber based pressure sensor, etc. The optical fiber based pressure sensor is a Fabry-Perot interference based sensor in which an interferometer is incorporated in a distal end portion thereof. In this sensor, the inside face of a silicon-made diaphragm is used as a mirror to make an interferometer pair with an end surface of an optical fiber, and the mirror interval (cavity length) is measured in wavelength of light, and is converted into a pressure value.

Although in the foregoing embodiments, the pressure sensor 12 and the signal processing circuit 13 are separate members, it is also possible to fabricate a signal processing circuit 13 in a semiconductor chip that forms a pressure sensor 12 shown in FIG. 2 and thus integrate the signal processing circuit 13 and the pressure sensor 12 in a single chip. Therefore, the pressure sensor 12 and the signal processing circuit 13 can be reduced in size.

While the above description is of the preferred embodiments of the present invention, it should be appreciated that the invention may be modified, altered, or varied without deviating from the scope and fair meaning of the following claims.

What is claimed is:

1. An electromagnetic valve comprising:
    a coil that forms a magnetic field when energized;
    a tubular sleeve which is disposed at an inner peripheral side of the coil and whose interior has a space;
    a stopper having an end side that is joined to the sleeve and closes an end of the sleeve;
    and an armature that is disposed slidably in the space in the sleeve, wherein
    the stopper is formed of a magnetic material, and forms a portion of a magnetic circuit,
    a deformable portion that deforms in accordance with a pressure in the space in the sleeve is formed in the stopper,
    the deformable portion is provided with a pressure sensor that measures an amount of deformation of the deformable portion, and
    the pressure sensor is made of semiconductor material and is a strain gage based pressure sensor, a specific resistance of the pressure sensor varies in accordance with stress, and the stopper is made of a material that has substantially the same linear expansion coefficient as the semiconductor material.

2. The electromagnetic valve according to claim 1, wherein the pressure sensor is a strain gage, and the strain gage is directly joined to the deformable portion.

3. The electromagnetic valve according to claim 1, wherein the deformable portion is formed in an end surface of one end of the stopper.

4. The electromagnetic valve according to claim 3, wherein the deformable portion has a generally flat surface.

5. The electromagnetic valve according to claim 1, wherein the stopper is made of a material that has substantially the same linear expansion coefficient as a material of a strain gage of the pressure sensor.

6. The electromagnetic valve according to claim 1, wherein the pressure sensor and a signal processing circuit for processing a signal from the pressure sensor are integrated in a chip.

7. The electromagnetic valve according to claim 1, wherein a signal processing circuit that processes a signal from the pressure sensor is attached to the stopper.

8. A fluid control apparatus comprising:
    an electromagnetic valve as described in claim 1;
    a housing having a fluid conduit that is opened and closed by the electromagnetic valve;
    and a circuit board having a control circuit that controls current flow to the coil,
    wherein the pressure sensor is electrically connected to the circuit board, and
    wherein the stopper extends toward the circuit board to a position such that the deformable portion is substantially flush with a surface of the circuit board.

9. A fluid control apparatus according to claim 8, wherein the pressure sensor and the circuit board are connected by wire bonding.

10. The electromagnetic valve according to claim 1, wherein the stopper is formed of a magnetic metal material, and the semiconductor material is silicon.

11. The electromagnetic valve according to claim 10, wherein the linear expansion coefficient of the deformable portion of the stopper and the semiconductor material is 11 ppm/° C. or less.

12. The electromagnetic valve according to claim 1, wherein the electromagnetic valve is normally closed, and when the coil is energized, the armature is attracted toward the stopper to open the electromagnetic valve.

13. The electromagnetic valve according to claim 1, wherein the deformable portion and the pressure sensor are centered on a longitudinal axis of the electromagnetic valve.

14. The electromagnetic valve according to claim 1, wherein the deformable portion is thinner than other portions of the stopper.

15. A fluid control apparatus comprising:
an electromagnetic valve comprising;
- a coil that forms a magnetic field when energized; a tubular sleeve which is disposed at an inner peripheral side of the coil and whose interior has a space;
- a stopper having an end side that is joined to the sleeve and closes an end of the sleeve; and
- an armature that is disposed slidably in the space in the sleeve,
- wherein the stopper is formed of a magnetic material, and forms a portion of a magnetic circuit,
- wherein a deformable portion that deforms in accordance with a pressure in the space in the sleeve is formed in the stopper,
- wherein the deformable portion is provided with a pressure sensor that measures an amount of deformation of the deformable portion;
- a housing having a fluid conduit that is opened and closed by the electromagnetic valve;
- a circuit board having a control circuit that controls current flow to the coil,
- wherein the pressure sensor is electrically connected to the circuit board, and
- wherein the stopper extends toward a side of the circuit board to such a position that a position such that the deformable portion is substantially flush with a surface of the circuit board.

16. The fluid control apparatus according to the claim 15, wherein the deformable portion is thinner than other portions of the stopper.

* * * * *